United States Patent
Tu (10) Patent No.: US 9,634,721 B2
(45) Date of Patent: Apr. 25, 2017

(54) METHOD AND APPARATUS FOR SENDING SELT MEASUREMENT SIGNAL, AND CONTROL DEVICE

(71) Applicant: HUAWEI TECHNOLOGIES CO., LTD., Shenzhen (CN)

(72) Inventor: Jianping Tu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 136 days.

(21) Appl. No.: 14/692,420

(22) Filed: Apr. 21, 2015

(65) Prior Publication Data
US 2015/0229356 A1    Aug. 13, 2015

Related U.S. Application Data (63) Continuation of application No. PCT/CN2012/083382, filed on Oct. 23, 2012.

(51) Int. Cl.
*H04B 3/32* (2006.01)
*H04M 3/30* (2006.01)
(Continued)

(52) U.S. Cl.
CPC .......... *H04B 3/32* (2013.01); *H04B 3/487* (2015.01); *H04L 41/0677* (2013.01);
(Continued)

(58) Field of Classification Search
CPC ....... H04B 3/32; H04B 3/487; H04L 43/0876; H04L 41/0677; H04M 11/062; H04M 3/22; H04M 3/306
See application file for complete search history.

(56) References Cited

U.S. PATENT DOCUMENTS

2007/0108989 A1* 5/2007 Shi .................. G01R 31/11
324/533
2009/0282292 A1* 11/2009 Squire ............. H04L 41/0631
714/39
(Continued)

FOREIGN PATENT DOCUMENTS

CN        1845566        10/2006
CN      101783779         7/2010
(Continued)

OTHER PUBLICATIONS

Chinese Office Action and Search Report dated Aug. 27, 2015 in corresponding Chinese Patent Application No. 201280001401.8.
(Continued)

*Primary Examiner* — Pao Sinkantarakorn
*Assistant Examiner* — Kabir Jahangir
(74) *Attorney, Agent, or Firm* — Staas & Halsey LLP (57) ABSTRACT

Embodiments of the present invention relate to a method and an apparatus for sending a single-ended loop testing SELT measurement signal, and a control device. The method for sending a SELT measurement signal includes: aligning a synchronization symbol of a digital subscriber line on which a SELT diagnosis needs to be performed with a synchronization symbol of at least one DSL line for data transmission, where the synchronization symbol of the digital subscriber line on which a SELT diagnosis needs to be performed and the synchronization symbol of the at least one digital subscriber line for data transmission are uplink or downlink synchronization symbols; and carrying a SELT measurement signal over the aligned synchronization symbol of the DSL line on which a SELT diagnosis needs to be performed, where the SELT measurement signal is used to detect transmission quality or a line fault of the DSL line.

15 Claims, 6 Drawing Sheets

(51) Int. Cl.
  *H04M 3/22*   (2006.01)
  *H04M 11/06*  (2006.01)
  *H04B 3/487*  (2015.01)
  *H04L 12/24*  (2006.01)
  *H04L 12/26*  (2006.01)

(52) U.S. Cl.
  CPC .......... *H04L 43/0876* (2013.01); *H04M 3/22* (2013.01); *H04M 3/306* (2013.01); *H04M 11/062* (2013.01)

(56) References Cited

U.S. PATENT DOCUMENTS

| | | | |
|---|---|---|---|
| 2010/0208785 A1* | 8/2010 | Lindqvist | H04B 3/32 375/227 |
| 2011/0058468 A1* | 3/2011 | Singh | H04M 3/304 370/201 |
| 2011/0268258 A1 | 11/2011 | Alloin et al. | |
| 2012/0051410 A1 | 3/2012 | Flowers et al. | |
| 2012/0140901 A1* | 6/2012 | Tennyson | H04M 3/306 379/27.01 |
| 2013/0148710 A1 | 6/2013 | Xu et al. | |
| 2013/0223599 A1* | 8/2013 | Drooghaag | H04B 3/46 379/27.01 |
| 2014/0133534 A1 | 5/2014 | Shi | |

FOREIGN PATENT DOCUMENTS

| | | |
|---|---|---|
| CN | 102257799 | 11/2011 |
| CN | 102318302 | 1/2012 |
| CN | 102379090 | 3/2012 |
| EP | 1 819 098 A1 | 8/2007 |
| EP | 2 293 535 A1 | 3/2011 |
| WO | 2010/086159 A1 | 8/2010 |

OTHER PUBLICATIONS

Extended European Search Report dated Sep. 2, 2015 in corresponding European Patent Application No. 12887202.5.
International Search Report mailed Jul. 25, 2013 in corresponding international application PCT/CN2012/083382.
PCT International Search Report dated Jul. 25, 2013 in corresponding International Patent Application No. PCT/CN2012/083382.

* cited by examiner

METHOD AND APPARATUS FOR SENDING SELT MEASUREMENT SIGNAL, AND CONTROL DEVICE

CROSS-REFERENCE TO RELATED APPLICATIONS

This application is a continuation of International Application No. PCT/CN2012/083382, filed on Oct. 23, 2012, which is hereby incorporated by reference in its entirety.

TECHNICAL FIELD

Embodiments of the present invention relate to the communications field, and in particular, to a method and an apparatus for sending a single-ended loop testing (SELT) measurement signal, and a control device.

BACKGROUND

A digital subscriber line (DSL) is a high-speed data transmission technology for transmitting data over a phone twisted-pair cable, for example, an unshielded twisted pair (UTP). There are multiple DSL lines in a DSL system. Currently, a DSL access multiplexer (DSLAM, Digital Subscriber Line Access Multiplexer) is generally used to provide an access service for the multiple DSL lines. However, due to an electromagnetic induction principle, mutual crosstalk is generated between multiple signals that gain access to the DSLAM.

To eliminate the crosstalk, for example, a Vectored DSL technology may be used to eliminate far-end crosstalk, and for example, a TDD DSL technology may be used to eliminate near-end crosstalk. The Vectored DSL technology uses a feasibility of performing combined receiving and sending at the DSLAM end and uses a signal processing method, so as to offset the crosstalk. The time division duplexing (TDD) DSL technology is an orthogonal frequency division multiplexing (OFDM) modulation technology of the time division duplex, and when the DSL system is at a frequency up to 100 MHz, this technology can greatly reduce a difficulty in designing a hybrid circuit.

Currently, before multiple DSL lines send a data signal, the multiple DSL lines may be trained, for example, by sending a training signal, to eliminate crosstalk between the multiple DSL lines. Then, a data signal is sent over multiple trained DSL lines.

Once a DSL line is faulty, a SELT measurement signal is sent over the faulty DSL line so as to diagnose the faulty DSL line. However, continuously sent SELT measurement signals within a relatively wide spectrum range cause interference to a data signal transmitted over a neighboring DSL line, even lead to generation of a bit error on the neighboring DSL line, and result in a disconnection in a serious situation.

Therefore, how to reduce crosstalk to a data signal sent over another DSL line is an urgent problem to be resolved, where the crosstalk is caused by a SELT measurement signal sent over a DSL line on which a SELT diagnosis is being performed.

SUMMARY

Embodiments of the present invention provide a method and an apparatus for sending a SELT measurement signal, and a control device, which aim to resolve a problem of how to reduce crosstalk to a data signal sent over another DSL line in a DSL system, where the crosstalk is caused by a SELT measurement signal sent over a DSL line on which a SELT diagnosis is being performed.

According to a first aspect, a method for sending a SELT measurement signal is provided, including: aligning a synchronization symbol of a DSL line on which a SELT diagnosis needs to be performed with a synchronization symbol of at least one DSL line for data transmission, where the synchronization symbol of the DSL line on which a SELT diagnosis needs to be performed and the synchronization symbol of the at least one DSL line for data transmission are uplink or downlink synchronization symbols; and carrying a SELT measurement signal over the aligned synchronization symbol of the DSL line on which a SELT diagnosis needs to be performed, where the SELT measurement signal is used to detect transmission quality or a line fault of the DSL line.

With reference to the first aspect, in a first implementation manner of the first aspect, the SELT measurement signal is orthogonal to a signal carried over the aligned synchronization symbol of the at least one DSL line for data transmission.

With reference to the first aspect and the foregoing implementation manner, in a second implementation manner of the first aspect, the signal carried over the aligned synchronization symbol of the at least one DSL line for data transmission includes a training signal, where the training signal is used to eliminate crosstalk on the DSL line.

With reference to the first aspect and the foregoing implementation manners, in a third implementation manner of the first aspect, the carrying a SELT measurement signal over the aligned synchronization symbol of the DSL line on which a SELT diagnosis needs to be performed includes: carrying the SELT measurement signal over some subcarriers of the aligned synchronization symbol of the DSL line on which a SELT diagnosis needs to be performed.

With reference to the first aspect and the foregoing implementation manners, in a fourth implementation manner of the first aspect, the some subcarriers are selected continuously or periodically.

With reference to the first aspect and the foregoing implementation manners, in a fifth implementation manner of the first aspect, the carrying a SELT measurement signal over the aligned synchronization symbol of the DSL line on which a SELT diagnosis needs to be performed includes: detecting whether a condition of carrying the SELT measurement signal is met; and carrying, when it is detected that the condition of carrying the SELT measurement signal is met, the SELT measurement signal over the aligned synchronization symbol of the DSL line on which a SELT diagnosis needs to be performed, until all SELT measurement signals are carried and sent.

With reference to the first aspect and the foregoing implementation manners, in a sixth implementation manner of the first aspect, the detecting whether a condition of carrying the SELT measurement signal is met includes: detecting whether the signal carried over the synchronization symbol of the at least one DSL line for data transmission is orthogonal to the SELT measurement signal; and the carrying, when it is detected that the condition of carrying the SELT measurement signal is met, the SELT measurement signal over the aligned synchronization symbol of the DSL line on which a SELT diagnosis needs to be performed, until all SELT measurement signals are carried and sent includes: when it is detected that the signal carried over the synchronization symbol of the at least one DSL line for data transmission is not orthogonal to the SELT measurement signal, interrupting carrying and sending the SELT measurement signal over the aligned synchronization symbol of the DSL line on which a SELT diagnosis needs to be performed; and when it is detected that the signal carried over the synchronization symbol of the at least one DSL line for data transmission is orthogonal to the SELT measurement signal, carrying the SELT measurement signal over the aligned synchronization symbol of the DSL line on which a SELT diagnosis needs to be performed, until all SELT measurement signals are carried and sent.

With reference to the first aspect and the foregoing implementation manners, in a seventh implementation manner of the first aspect, the detecting whether a condition of carrying the SELT measurement signal is met includes: detecting whether the signal carried over the synchronization symbol of the at least one DSL line for data transmission and the SELT measurement signal are carried and sent over different subcarriers; and the carrying, when it is detected that the condition of carrying the SELT measurement signal is met, the SELT measurement signal over the aligned synchronization symbol of the DSL line on which a SELT diagnosis needs to be performed, until all SELT measurement signals are carried and sent includes: when it is detected that the signal carried over the synchronization symbol of the at least one DSL line for data transmission and the SELT measurement signal are carried and sent over a same subcarrier, interrupting carrying and sending the SELT measurement signal over the aligned synchronization symbol of the DSL line on which a SELT diagnosis needs to be performed; and when it is detected that the signal carried over the synchronization symbol of the at least one DSL line for data transmission and the SELT measurement signal are carried and sent over different subcarriers, carrying the SELT measurement signal over the aligned synchronization symbol of the DSL line on which a SELT diagnosis needs to be performed, until all SELT measurement signals are carried and sent.

With reference to the first aspect and the foregoing implementation manners, in an eighth implementation manner of the first aspect, the detecting whether a condition of carrying the SELT measurement signal is met includes: detecting whether a downlink synchronization symbol of the DSL line on which a SELT diagnosis needs to be performed and a downlink synchronization symbol of the at least one DSL line for data transmission are in a TDD downlink timeslot; and the carrying, when it is detected that the condition of carrying the SELT measurement signal is met, the SELT measurement signal over the aligned synchronization symbol of the DSL line on which a SELT diagnosis needs to be performed, until all SELT measurement signals are carried and sent includes: when it is detected that the downlink synchronization symbol of the DSL line on which a SELT diagnosis needs to be performed and the downlink synchronization symbol of the at least one DSL line for data transmission are in a TDD uplink timeslot, interrupting carrying and sending the SELT measurement signal over the aligned downlink synchronization symbol of the DSL line on which a SELT diagnosis needs to be performed; and when it is detected that the downlink synchronization symbol of the DSL line on which a SELT diagnosis needs to be performed and the downlink synchronization symbol of the at least one DSL line for data transmission are in a TDD downlink timeslot, carrying the SELT measurement signal over the aligned downlink synchronization symbol of the DSL line on which a SELT diagnosis needs to be performed, until all SELT measurement signals are carried and sent.

With reference to the first aspect and the foregoing implementation manners, in a ninth implementation manner of the first aspect, the detecting whether a condition of carrying the SELT measurement signal is met includes: detecting whether an uplink synchronization symbol of the DSL line on which a SELT diagnosis needs to be performed and an uplink synchronization symbol of the at least one DSL line for data transmission are in a TDD uplink timeslot; and the carrying, when it is detected that the condition of carrying the SELT measurement signal is met, the SELT measurement signal over the aligned synchronization symbol of the DSL line on which a SELT diagnosis needs to be performed, until all SELT measurement signals are carried and sent includes: when it is detected that the uplink synchronization symbol of the DSL line on which a SELT diagnosis needs to be performed and the uplink synchronization symbol of the at least one DSL line for data transmission are in a TDD downlink timeslot, interrupting carrying and sending the SELT measurement signal over the aligned uplink synchronization symbol of the DSL line on which a SELT diagnosis needs to be performed; and when it is detected that the uplink synchronization symbol of the DSL line on which a SELT diagnosis needs to be performed and the uplink synchronization symbol of the at least one DSL line for data transmission are in a TDD uplink timeslot, carrying the SELT measurement signal over the aligned uplink synchronization symbol of the DSL line on which a SELT diagnosis needs to be performed, until all SELT measurement signals are carried and sent.

According to a second aspect, an apparatus for sending a SELT measurement signal is provided, including: an alignment unit, configured to align a synchronization symbol of a DSL line on which a SELT diagnosis needs to be performed with a synchronization symbol of at least one DSL line for data transmission, where the synchronization symbol of the digital subscriber line on which a SELT diagnosis needs to be performed and the synchronization symbol of the at least one digital subscriber line for data transmission are uplink or downlink synchronization symbols; and a sending unit, configured to carry a SELT measurement signal over the aligned synchronization symbol of the DSL line on which a SELT diagnosis needs to be performed, where the SELT measurement signal is used to detect transmission quality or a line fault of the DSL line.

With reference to the second aspect, in a first implementation manner of the second aspect, the sending unit includes: a detecting module, configured to detect whether a condition of carrying the SELT measurement signal is met; and a sending module, configured to, when it is detected that the condition of carrying the SELT measurement signal is met, carry the SELT measurement signal over the aligned synchronization symbol of the DSL line on which a SELT diagnosis needs to be performed, until all SELT measurement signals are carried and sent.

With reference to the second aspect and the foregoing implementation manner, in a second implementation manner of the second aspect, the detecting module is specifically configured to detect whether a signal carried over the synchronization symbol of the at least one DSL line for data transmission is orthogonal to the SELT measurement signal; and the sending module is specifically configured to, when the detecting module detects that the signal carried over the synchronization symbol of the at least one DSL line for data transmission is not orthogonal to the SELT measurement signal, interrupt carrying and sending the SELT measurement signal over the aligned synchronization symbol of the DSL line on which a SELT diagnosis needs to be performed; and when the detecting module detects that the signal carried over the synchronization symbol of the at least one DSL line for data transmission is orthogonal to the SELT measurement signal, carry the SELT measurement signal over the aligned synchronization symbol of the DSL line on which a SELT diagnosis needs to be performed, until all SELT measurement signals are carried and sent.

With reference to the second aspect and the foregoing implementation manners, in a third implementation manner of the second aspect, the detecting module is specifically configured to detect whether a signal carried over the synchronization symbol of the at least one DSL line for data transmission and the SELT measurement signal are carried and sent over different subcarriers; and the sending module is specifically configured to, when the detecting module detects that the signal carried over the synchronization symbol of the at least one DSL line for data transmission and the SELT measurement signal are carried and sent over a same subcarrier, interrupt carrying and sending the SELT measurement signal over the aligned synchronization symbol of the DSL line on which a SELT diagnosis needs to be performed; and when the detecting module detects that the signal carried over the synchronization symbol of the at least one DSL line for data transmission and the SELT measurement signal are carried and sent over different subcarriers, carry the SELT measurement signal over the aligned synchronization symbol of the DSL line on which a SELT diagnosis needs to be performed, until all SELT measurement signals are carried and sent.

With reference to the second aspect and the foregoing implementation manners, in a fourth implementation manner of the second aspect, the detecting module is specifically configured to detect whether a downlink synchronization symbol of the DSL line on which a SELT diagnosis needs to be performed and a downlink synchronization symbol of the at least one DSL line for data transmission are in a TDD downlink timeslot; and the sending module is specifically configured to, when the detecting module detects that the downlink synchronization symbol of the DSL line on which a SELT diagnosis needs to be performed and the downlink synchronization symbol of the at least one DSL line for data transmission are in a TDD uplink timeslot, interrupt carrying and sending the SELT measurement signal over the aligned downlink synchronization symbol of the DSL line on which a SELT diagnosis needs to be performed; and when the detecting module detects that the downlink synchronization symbol of the DSL line on which a SELT diagnosis needs to be performed and the downlink synchronization symbol of the at least one DSL line for data transmission are in a TDD downlink timeslot, carry the SELT measurement signal over the aligned downlink synchronization symbol of the DSL line on which a SELT diagnosis needs to be performed, until all SELT measurement signals are carried and sent.

With reference to the second aspect and the foregoing implementation manners, in a fifth implementation manner of the second aspect, the detecting module is specifically configured to detect whether an uplink synchronization symbol of the DSL line on which a SELT diagnosis needs to be performed and an uplink synchronization symbol of the at least one DSL line for data transmission are in a TDD uplink timeslot; and the sending module is specifically configured to, when the detecting module detects that the uplink synchronization symbol of the DSL line on which a SELT diagnosis needs to be performed and the uplink synchronization symbol of the at least one DSL line for data transmission are in a TDD downlink timeslot, interrupt carrying and sending the SELT measurement signal over the aligned uplink synchronization symbol of the DSL line on which a SELT diagnosis needs to be performed; and when the detecting module detects that the uplink synchronization symbol of the DSL line on which a SELT diagnosis needs to be performed and the uplink synchronization symbol of the at least one DSL line for data transmission are in a TDD uplink timeslot, carry the SELT measurement signal over the aligned uplink synchronization symbol of the DSL line on which a SELT diagnosis needs to be performed, until all SELT measurement signals are carried and sent.

According to a third aspect, a control device for controlling sending of a SELT measurement signal is provided, including: a control entity, configured to align a synchronization symbol of a DSL line on which a SELT diagnosis needs to be performed with a synchronization symbol of at least one DSL line for data transmission, where the synchronization symbol of the digital subscriber line on which a SELT diagnosis needs to be performed and the synchronization symbol of the at least one digital subscriber line for data transmission are uplink or downlink synchronization symbols; and a transceiver, configured to carry a SELT measurement signal over the aligned synchronization symbol of the DSL line on which a SELT diagnosis needs to be performed, where the SELT measurement signal is used to detect transmission quality or a line fault of the DSL line.

With reference to the third aspect, in a first implementation manner of the third aspect, the control entity is further configured to detect whether a condition of carrying the SELT measurement signal is met; and when it is detected that the condition of carrying the SELT measurement signal is met, control the transceiver to carry the SELT measurement signal over the aligned synchronization symbol of the DSL line on which a SELT diagnosis needs to be performed, until all SELT measurement signals are carried and sent.

In the embodiments of the present invention, a data signal is not sent over a downlink synchronization symbol or an uplink synchronization symbol of each DSL line. Therefore, sending a SELT measurement signal over an aligned synchronization symbol can effectively reduce crosstalk to a data signal sent over another DSL line, where the crosstalk is caused by a SELT measurement signal sent over a DSL line on which a SELT diagnosis is being performed.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, for example: GSM, a Code Division Multiple Access (CDMA) system, Wideband Code Division Multiple Access (WCDMA), GPRS, and LTE.

A UE may also be referred to as a mobile terminal, a mobile station, and the like, and may communicate with one or more core networks by using a radio access network (RAN). The UE exchanges voice and/or data with the radio access network.

A base station may be a base station (Base Transceiver Station, BTS) in GSM or CDMA, may also be a base station (Node B) in WCDMA, and may further be an evolved NodeB (eNB, e-NodeB, or evolved Node B) in LTE. In addition, one base station may support/manage one or more cells. When a UE needs to communicate with a network, the UE chooses a cell to initiate network access.

To eliminate crosstalk, sending a SELT measurement signal over a synchronization symbol is considered in the embodiments of the present application, so as to avoid that the SELT measurement signal affects a data signal on another line.

Figure 1:
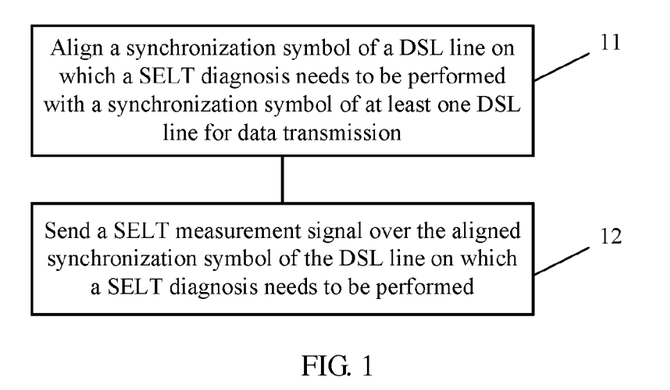
FIG. 1 is a flowchart of a method for sending a SELT measurement signal according to an embodiment of the present invention.

Referring to FIG. 1, the following describes in detail a method for sending a SELT measurement signal according to an embodiment of the present invention, and the method includes the following steps:

Step 11: Align a synchronization symbol of a DSL line on which a SELT diagnosis needs to be performed with a synchronization symbol of at least one DSL line for data transmission, where the synchronization symbol of the digital subscriber line on which a SELT diagnosis needs to be performed and the synchronization symbol of the at least one digital subscriber line for data transmission are uplink or downlink synchronization symbols.

Generally, a downlink synchronization symbol of the DSL line on which a SELT diagnosis needs to be performed is aligned with a downlink synchronization symbol of the at least one DSL line for data transmission, and an uplink synchronization symbol of the DSL line on which a SELT diagnosis needs to be performed is aligned with an uplink synchronization symbol of the at least one DSL line for data transmission. For brevity in the following, this sentence is presented as follows: A downlink or an uplink synchronization symbol of the DSL line on which a SELT diagnosis needs to be performed is aligned with a downlink or an uplink synchronization symbol of the at least one DSL line for data transmission.

For example, the downlink synchronization symbol of the DSL line on which a SELT diagnosis needs to be performed is aligned with a downlink synchronization symbol of one DSL line for data transmission, and then may be gradually aligned with a downlink synchronization symbol of another DSL line for data transmission.

Alternatively, the uplink synchronization symbol of the DSL line on which a SELT diagnosis needs to be performed is aligned with an uplink synchronization symbol of one DSL line for data transmission, and then may be gradually aligned with an uplink synchronization symbol of another DSL line for data transmission.

Generally, a data signal is not sent over a downlink synchronization symbol or an uplink synchronization symbol of each DSL line. However a vectored training signal used to eliminate crosstalk on the DSL line, an identifier bit used to identify a start location and an end location of the training signal over the synchronization symbol, or another signal may be sent over the downlink synchronization symbol or the uplink synchronization symbol of each DSL line.

Step 12: Carry and send a SELT measurement signal over the aligned synchronization symbol of the DSL line on which a SELT diagnosis needs to be performed, where the SELT measurement signal is used to detect transmission quality or a line fault of the DSL line.

A downlink synchronization symbol or an uplink synchronization symbol of each DSL line does not carry a data signal. Therefore, if an aligned synchronization symbol is selected to carry a SELT measurement signal, crosstalk to a data signal sent over another DSL line can be effectively reduced, where the crosstalk is caused by a SELT measurement signal sent over a DSL line on which a SELT diagnosis is being performed.

Reducing crosstalk between a SELT measurement signal carried over a synchronization symbol and another signal may further be considered. With reference to the accompanying drawings, the following several embodiments describe how to eliminate the crosstalk between the SELT measurement signal carried over the synchronization symbol and another signal.

Figure 2:
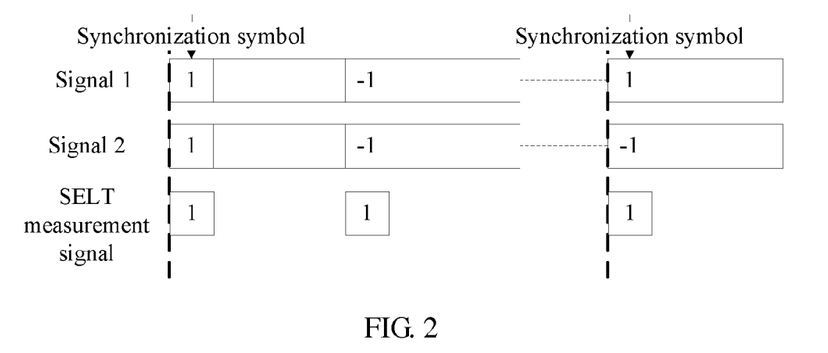
FIG. 2 is a schematic diagram of sending a SELT measurement signal used as a periodic signal according to an embodiment of the present invention.

Generally, a SELT measurement signal carried over a synchronization symbol may be various signals, such as a periodic signal. FIG. 2 shows an embodiment, where downlink or uplink synchronization symbols of three DSL lines are aligned, a SELT measurement signal which is a periodic signal is carried over a downlink synchronization symbol or an uplink synchronization symbol of a DSL line on which a SELT diagnosis needs to be performed, and training signals are carried over downlink or uplink synchronization symbols of the other two DSL lines for data transmission. An aligned synchronization symbol does not carry a data signal, and therefore a SELT measurement signal does not cause crosstalk to a data signal of another DSL line. Meanwhile, it is assumed that a SELT measurement signal and a training signal are separately carried over a synchronization symbol of each DSL line, and therefore the SELT measurement signal is considered as noise and then is trained, thereby eliminating crosstalk caused by the SELT measurement signal to a training signal of another DSL line.

Figure 3:
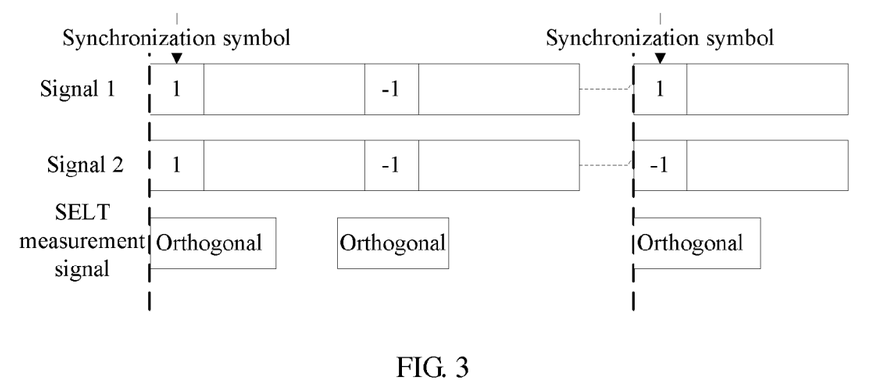
FIG. 3 is a schematic diagram of sending a SELT measurement signal used as an orthogonal signal according to an embodiment of the present invention.

Alternatively, the SELT measurement signal may also be orthogonal to a signal carried over the aligned downlink or uplink synchronization symbol of at least one DSL line for data transmission. FIG. 3 shows another embodiment, where downlink or uplink synchronization symbols of three DSL lines are aligned, and a SELT measurement signal carried over a downlink synchronization symbol or an uplink synchronization symbol of a DSL line on which a SELT diagnosis is being performed is orthogonal to signals carried over downlink synchronization symbols or uplink synchronization symbols of the other two DSL lines for data transmission. It is assumed that a SELT measurement signal and a training signal are carried over a synchronization symbol of each DSL line; because the SELT measurement signal and the training signal are orthogonal, impact of the SELT measurement signal on training precision of a system can be avoided.

In addition, carrying of the SELT measurement signal may also be optimized further in a frequency domain. For example, the SELT measurement signal may be carried and sent over some subcarriers of the foregoing aligned downlink or uplink synchronization symbol of the DSL line on which a SELT diagnosis needs to be performed. The some subcarriers are selected continuously or periodically. For example, generally, asymmetric digital subscriber lines (ADSL) have relatively weak crosstalk on a 2+ frequency band (that is, within 2.2 MHz) and relatively low mutual impact. For some subcarriers, continuous subcarrier within 2.2 MHz may be selected to perform sending. For some subcarriers that are periodically selected, for example, the SELT measurement signal is only sent over the $(4n+3)^{th}$ subcarrier, and the training signal is sent over the $4n^{th}$ subcarrier, the $(4n+1)^{th}$ subcarrier, or the $(4n+2)^{th}$ subcarrier, where n is a positive integer.

In this way, the SELT measurement signal and a signal carried over the aligned downlink or uplink synchronization symbol of the at least one DSL line for data transmission are carried and sent over different subcarriers, thereby avoiding that the SELT measurement signal affects stability of the system.

The foregoing describes that impact, of a SELT measurement signal carried over a synchronization symbol, on a signal carried over another synchronization symbol is eliminated by means of classification of signal types or frequency domains. With reference to the accompanying drawings, the following embodiments describe how to optimize a process of carrying and sending the SELT measurement signal, so as to further eliminate impact, of the SELT measurement signal carried over the synchronization symbol, on a training signal carried over another synchronization symbol.

In conclusion, whether a condition of carrying the SELT measurement signal is met may be first detected; then, when it is detected that the condition of carrying the SELT measurement signal is met, the SELT measurement signal is carried over the aligned downlink or uplink synchronization symbol of the DSL line on which a SELT diagnosis needs to be performed, until all SELT measurement signals are carried and sent.

For example, in an embodiment, it is first detected whether a signal carried over a downlink or an uplink synchronization symbol of the at least one DSL line for data transmission is orthogonal to the SELT measurement signal. If it is detected that the signal carried over the downlink or uplink synchronization symbol of the at least one DSL line for data transmission is not orthogonal to the SELT measurement signal, carrying and sending the SELT measurement signal over the aligned downlink or uplink synchronization symbol of the DSL line on which a SELT diagnosis needs to be performed is interrupted; and if it is detected that the signal carried over the downlink or uplink synchronization symbol of the at least one DSL line for data transmission is orthogonal to the SELT measurement signal, the SELT measurement signal is carried over the aligned downlink or uplink synchronization symbol of the DSL line on which a SELT diagnosis needs to be performed, until all SELT measurement signals are carried and sent.

Figure 4:
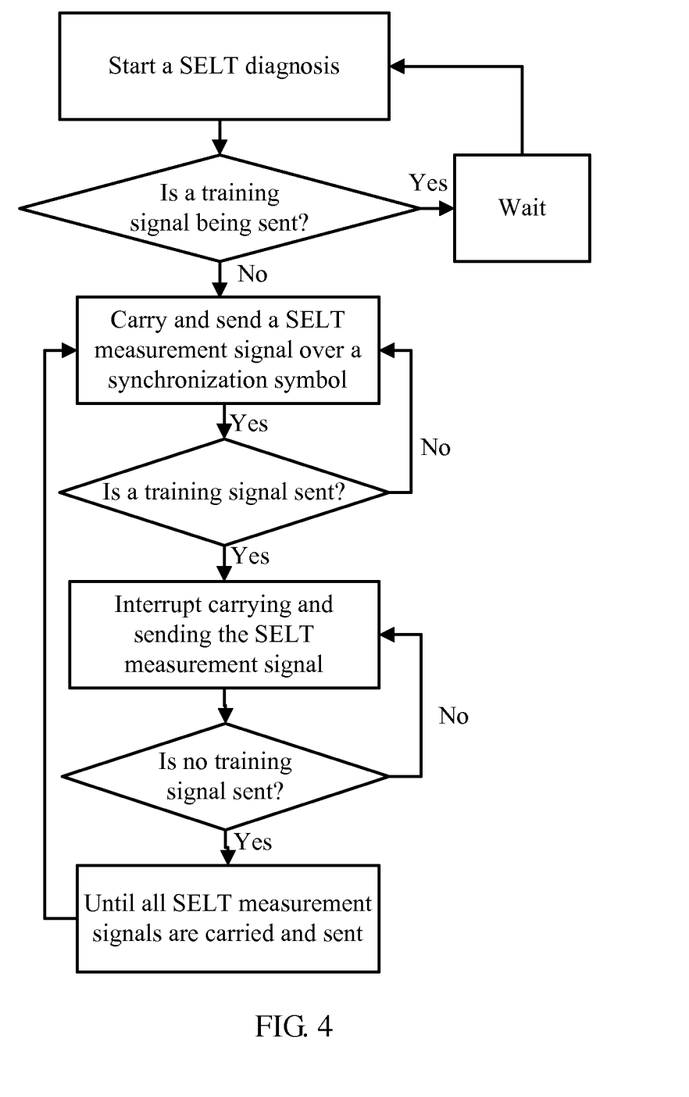
FIG. 4 is a flowchart of a method for sending a SELT measurement signal according to a specific embodiment of the present invention.

In a specific embodiment shown in FIG. 4, a SELT measurement signal is a periodic signal. When a SELT diagnosis is started on a DSL line, a control unit (which, for example, may be a vectoring control entity (VCE) in a vectored DSL system) first detects whether a training signal is being carried and sent over a downlink or an uplink synchronization symbol of at least one DSL line for data transmission. If yes, the control unit controls not to send the SELT measurement signal. Once it is detected that no line over which a training signal is being sent exists, the SELT measurement signal is carried and sent over the synchronization symbol. In the entire process, the control unit is detecting all the time whether a training signal is being carried over a downlink or an uplink synchronization symbol of at least one DSL line for data transmission. Once the DSL line is detected, the control unit controls to interrupt sending of the SELT measurement signal; and if the DSL line is not detected, the SELT measurement signal continues to be carried over the synchronization symbol until all SELT measurement signals are carried and sent.

Figure 5:
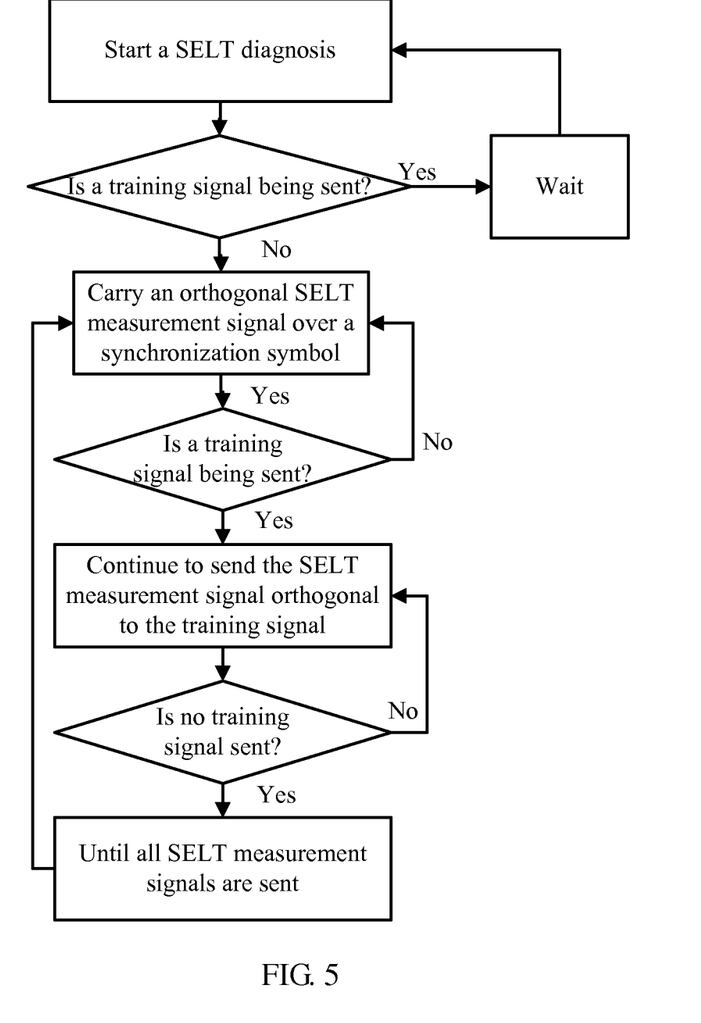
FIG. 5 is a flowchart of a method for sending a SELT measurement signal according to another specific embodiment of the present invention.

In a specific embodiment shown in FIG. 5, a SELT measurement signal and a training signal are orthogonal. When a SELT diagnosis is started on a DSL line, a control unit first detects whether a training signal is being carried and sent over a downlink or an uplink synchronization symbol of at least one DSL line for data transmission. If yes, the control unit controls the SELT measurement signal not to be sent. Once it is detected that no line over which a training signal is being carried and sent exists, the SELT measurement signal is carried and sent over the synchronization symbol. In the entire process, the control unit is detecting all the time whether a training signal is being carried and sent over a downlink or an uplink synchronization symbol of at least one DSL line for data transmission. The SELT measurement signal and the training signal are orthogonal. Therefore, even if it is detected that there is a DSL line over which a training signal is being carried and sent, there is no need to interrupt carrying and sending the SELT measurement signal, and the SELT measurement signal can be continuously carried and sent over the synchronization symbol until all SELT measurement signals are carried and sent.

In an extended embodiment, if the SELT measurement signal is distinguished from the training signal in the frequency domain, for example, the SELT measurement signal and the training signal are carried and sent over different subcarriers, specifically, the control unit may detect whether a signal carried over the downlink or uplink synchronization symbol of the at least one DSL line for data transmission and the SELT measurement signal are carried and sent over different subcarriers, or whether the SELT measurement signal is carried and sent only on an extremely low frequency band. For example, the SELT measurement signal and the training signal are carried and sent over spaced subcarriers; or the SELT measurement signal is carried and sent only on a low frequency band within 2.2 MHz, and the training signal is carried and sent on a frequency band higher than 2.2 MHz. If it is detected that the signal carried over the downlink or uplink synchronization symbol of the at least one DSL line for data transmission and the SELT measurement signal are carried and sent over a same subcarrier, carrying and sending the SELT measurement signal over the aligned downlink or uplink synchronization symbol of the DSL line on which a SELT diagnosis needs to be performed is interrupted; and if it is detected that the signal carried over the downlink or uplink synchronization symbol of the at least one DSL line for data transmission and the SELT measurement signal are carried and sent over different subcarriers, the SELT measurement signal is carried over the aligned downlink or uplink synchronization symbol of the DSL line on which a SELT diagnosis needs to be performed, until all SELT measurement signals are carried and sent.

Figure 6:
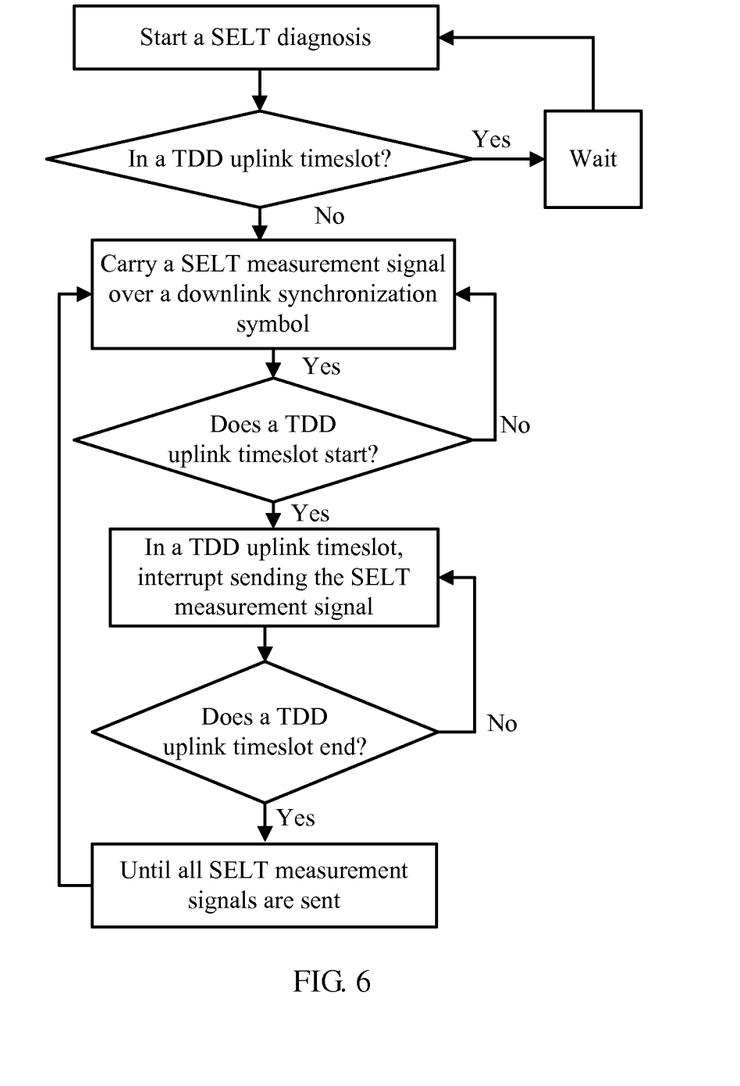
FIG. 6 is a flowchart of a method for sending a SELT measurement signal according to another specific embodiment of the present invention.

FIG. 6 shows another specific embodiment of a DSL system applied to TDD. When a SELT diagnosis is started on a DSL line, a control unit (for example, may be a node control entity (NCE) in the DSL system in TDD) first detects whether a downlink synchronization symbol of a DSL line on which a SELT diagnosis needs to be performed and a downlink synchronization symbol of a at least one DSL line for data transmission are in a TDD downlink timeslot. When it is detected that the downlink synchronization symbol of the DSL line on which a SELT diagnosis needs to be performed and the downlink synchronization symbol of the at least one DSL line for data transmission are in a TDD uplink timeslot, carrying and sending a SELT measurement signal over the aligned downlink synchronization symbol of the DSL line on which a SELT diagnosis needs to be performed is interrupted; and when it is detected that the downlink synchronization symbol of the DSL line on which a SELT diagnosis needs to be performed and the downlink synchronization symbol of the at least one DSL line for data transmission are in a TDD downlink timeslot, the SELT measurement signal is carried over the aligned downlink synchronization symbol of the DSL line on which a SELT diagnosis needs to be performed, until all SELT measurement signals are carried and sent.

Figure 7:
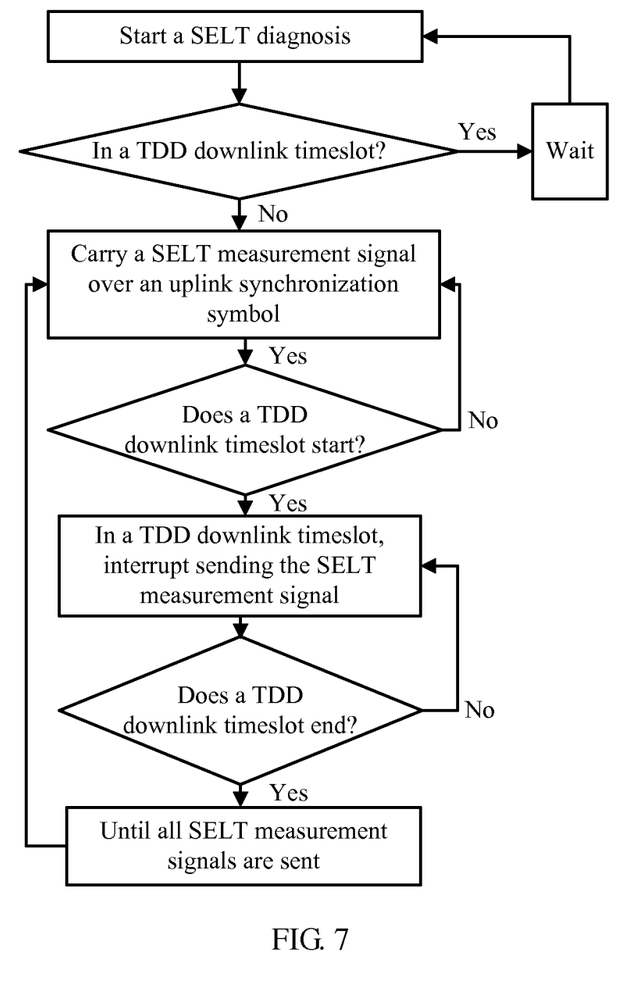
FIG. 7 is a flowchart of a method for sending a SELT measurement signal according to another specific embodiment of the present invention.

Alternatively, FIG. 7 shows a variation corresponding to the embodiment shown in FIG. 6. When a SELT diagnosis is started on a DSL line, a control unit detects whether an uplink synchronization symbol of the DSL line on which a SELT diagnosis needs to be performed and an uplink synchronization symbol of the at least one DSL line for data transmission are in a TDD uplink timeslot. When it is detected that the uplink synchronization symbol of the DSL line on which a SELT diagnosis needs to be performed and the uplink synchronization symbol of the at least one DSL line for data transmission are in a TDD downlink timeslot, carrying and sending a SELT measurement signal over the aligned uplink synchronization symbol of the DSL line on which a SELT diagnosis needs to be performed is interrupted; and when it is detected that the uplink synchronization symbol of the DSL line on which a SELT diagnosis needs to be performed and the uplink synchronization symbol of the at least one DSL line for data transmission are in a TDD uplink timeslot, the SELT measurement signal is carried over the aligned uplink synchronization symbol of the DSL line on which a SELT diagnosis needs to be performed, until all SELT measurement signals are carried and sent.

Figure 8:
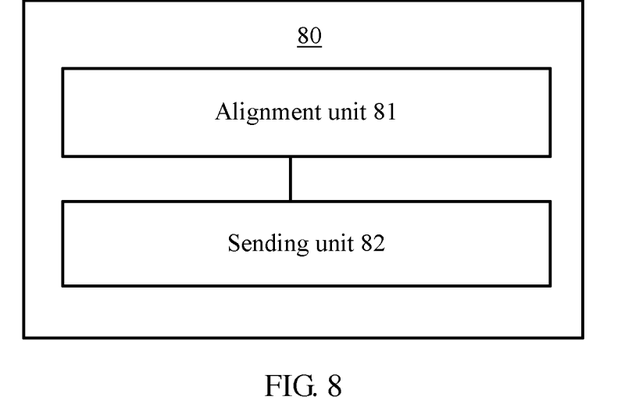
FIG. 8 is a schematic structural diagram of an apparatus for sending a SELT measurement signal according to an embodiment of the present invention.
Figure 9:
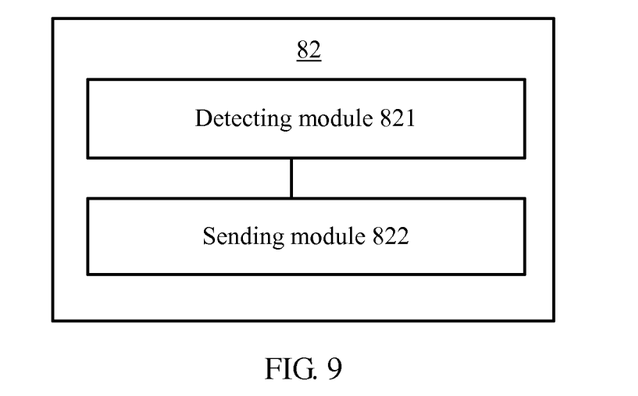
FIG. 9 is a schematic structural diagram of an apparatus for sending a SELT measurement signal according to another embodiment of the present invention.

With reference to FIG. 8 and FIG. 9, the following describes in detail a structure of an apparatus for sending a SELT measurement signal according to the embodiments of the present invention.

In FIG. 8, an apparatus 80 includes an alignment unit 81 and a sending unit 82.

The alignment unit 81 is configured to align a synchronization symbol of a DSL line on which a SELT diagnosis needs to be performed with a synchronization symbol of at least one DSL line for data transmission, where the synchronization symbol of the digital subscriber line on which a SELT diagnosis needs to be performed and the synchronization symbol of the at least one digital subscriber line for data transmission are uplink or downlink synchronization symbols. The sending unit 82 is configured to carry a SELT measurement signal over the aligned synchronization symbol of the DSL line on which a SELT diagnosis needs to be performed, where the SELT measurement signal is used to detect transmission quality or a line fault of the DSL line.

For example, a signal carried over the aligned synchronization symbol of the at least one DSL line for data transmission may include a training signal, where the training signal is used to eliminate crosstalk on the DSL line.

To better eliminate crosstalk caused by the SELT measurement signal to the signal carried over the aligned downlink or uplink synchronization symbol of the at least one DSL line for data transmission, the SELT measurement signal and the signal carried over the aligned downlink or uplink synchronization symbol of the at least one DSL line for data transmission may be made orthogonal to each other; or, the SELT measurement signal is carried and sent over some subcarriers of the aligned downlink or uplink synchronization symbol of the DSL line on which a SELT diagnosis needs to be performed.

The following provides a specific embodiment of the sending unit 82. The sending unit 82 includes a detecting module 821 and a sending module 822, as shown in FIG. 9.

The detecting module 821 is configured to detect whether a condition of carrying the SELT measurement signal is met.

The sending module 822 is configured to, when it is detected that the condition of carrying the SELT measurement signal is met, carry the SELT measurement signal over the aligned downlink or uplink synchronization symbol of the DSL line on which a SELT diagnosis needs to be performed, until all SELT measurement signals are carried and sent.

In a specific embodiment, the detecting module 821 may be configured to detect whether the signal carried over the downlink or uplink synchronization symbol of the at least one DSL line for data transmission is orthogonal to the SELT measurement signal. When the detecting module 821 detects that the signal carried over the downlink or uplink synchronization symbol of the at least one DSL line for data transmission is not orthogonal to the SELT measurement signal, the sending module 822 may interrupt carrying and sending the SELT measurement signal over the aligned downlink or uplink synchronization symbol of the DSL line on which a SELT diagnosis needs to be performed; or when the detecting module 821 detects that the signal carried over the downlink or uplink synchronization symbol of the at least one DSL line for data transmission is orthogonal to the SELT measurement signal, the sending module 822 may carry the SELT measurement signal over the aligned downlink or uplink synchronization symbol of the DSL line on which a SELT diagnosis needs to be performed, until all SELT measurement signals are carried and sent.

In another specific embodiment, the detecting module 821 may be configured to detect whether the signal carried over the downlink or uplink synchronization symbol of the at least one DSL line for data transmission and the SELT measurement signal are carried and sent over different subcarriers. When the detecting module 821 detects that the signal carried over the downlink or uplink synchronization symbol of the at least one DSL line for data transmission and the SELT measurement signal are carried and sent over a same subcarrier, the sending module 822 may interrupt carrying and sending the SELT measurement signal over the aligned downlink or uplink synchronization symbol of the DSL line on which a SELT diagnosis needs to be performed; or when the detecting module 821 detects that the signal carried over the downlink or uplink synchronization symbol of the at least one DSL line for data transmission and the SELT measurement signal are carried and sent over different subcarriers, the sending module 822 may carry the SELT measurement signal over the aligned downlink or uplink synchronization symbol of the DSL line on which a SELT diagnosis needs to be performed, until all SELT measurement signals are carried and sent.

In another specific embodiment, the detecting module 821 may be configured to detect whether a downlink synchronization symbol of the DSL line on which a SELT diagnosis needs to be performed and a downlink synchronization symbol of the at least one DSL line for data transmission are in a TDD downlink timeslot. When the detecting module 821 detects that the downlink synchronization symbol of the DSL line on which a SELT diagnosis needs to be performed and the downlink synchronization symbol of the at least one DSL line for data transmission are in a TDD uplink timeslot, the sending module 822 may interrupt carrying and sending the SELT measurement signal over the aligned downlink synchronization symbol of the DSL line on which a SELT diagnosis needs to be performed; or, when the detecting module 821 detects that the downlink synchronization symbol of the DSL line on which a SELT diagnosis needs to be performed and the downlink synchronization symbol of the at least one DSL line for data transmission are in a TDD downlink timeslot, the sending module 822 may carry the SELT measurement signal over the aligned downlink synchronization symbol of the DSL line on which a SELT diagnosis needs to be performed, until all SELT measurement signals are carried and sent.

In another specific embodiment, the detecting module 821 may be configured to detect whether an uplink synchronization symbol of the DSL line on which a SELT diagnosis needs to be performed and an uplink synchronization symbol of the at least one DSL line for data transmission are in a TDD uplink timeslot. When the detecting module 821 detects that the uplink synchronization symbol of the DSL line on which a SELT diagnosis needs to be performed and the uplink synchronization symbol of the at least one DSL line for data transmission are in a TDD downlink timeslot, the sending module 822 may interrupt carrying and sending the SELT measurement signal over the aligned uplink synchronization symbol of the DSL line on which a SELT diagnosis needs to be performed; or, when the detecting module 821 detects that the uplink synchronization symbol of the DSL line on which a SELT diagnosis needs to be performed and the uplink synchronization symbol of the at least one DSL line for data transmission are in a TDD uplink timeslot, the sending module 822 may carry the SELT measurement signal over the aligned uplink synchronization symbol of the DSL line on which a SELT diagnosis needs to be performed, until all SELT measurement signals are carried and sent.

It can be learned that a downlink synchronization symbol or an uplink synchronization symbol of each DSL line does not carry a data signal in this embodiment of the present invention. Therefore, carrying a SELT measurement signal over an aligned synchronization symbol can effectively reduce crosstalk to a data signal sent over another DSL line, where the crosstalk is caused by a SELT measurement signal sent over a DSL line on which a SELT diagnosis is being performed.

Figure 10:
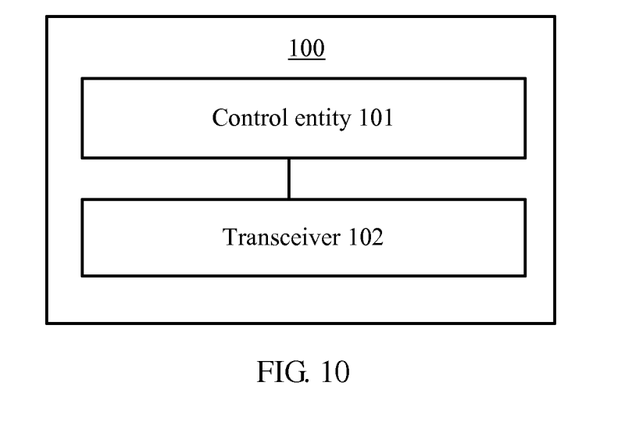
FIG. 10 is a schematic structural diagram of a control device according to an embodiment of the present invention.

FIG. 10 shows a control device according to an embodiment of the present invention. A control device 100 shown in FIG. 10 includes a control entity 101 and a transceiver 102.

The control entity 101 is configured to align a synchronization symbol of a DSL line on which a SELT diagnosis needs to be performed with a synchronization symbol of at least one DSL line for data transmission, where the synchronization symbol of the digital subscriber line on which a SELT diagnosis needs to be performed and the synchronization symbol of the at least one digital subscriber line for data transmission are uplink or downlink synchronization symbols. The transceiver 102 is configured to carry a SELT measurement signal over the aligned synchronization symbol of the DSL line on which a SELT diagnosis needs to be performed, where the SELT measurement signal is used to detect transmission quality or a line fault of the DSL line.

Further, the control entity 101 may further be configured to: detect whether a condition of carrying the SELT measurement signal is met; and when it is detected that the condition of carrying the SELT measurement signal is met, control the transceiver 102 to carry the SELT measurement signal over the aligned synchronization symbol of the DSL line on which a SELT diagnosis needs to be performed, until all SELT measurement signals are carried and sent.

Generally, the control entity 101 in the control device 100 may be a VCE in a Vectored DSL system, an NCE in a TDD DSL system, or another control unit.

Further, the control device 100 may be, for example, a single digital signal processor (DSP); or the control device 100, for example, may be integrated into a DSLAM, so as to control the DSLAM to send the SELT measurement signal; or the control device 100, for example, may be a DSLAM, and a master chip of the DSLAM has a control function of the control device 100 described in FIG. 10.

It can be learned that a data signal is not sent over a downlink synchronization symbol or an uplink synchronization symbol of each DSL line in this embodiment of the present invention. Therefore, sending a SELT measurement signal over an aligned synchronization symbol can effectively reduce crosstalk to a data signal sent over another DSL line, where the crosstalk is caused by a SELT measurement signal sent over a DSL line on which a SELT diagnosis is being performed.

It should be understood that, the solutions described in each claim of the present invention should be considered as an embodiment, and characteristics in claims may be combined. Steps of different branches performed after the determining steps of the present invention, for example, may be considered as different embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for sending a single-ended loop testing (SELT) measurement signal, comprising:
aligning a synchronization symbol of a digital subscriber line on which a SELT diagnosis needs to be performed with a synchronization symbol of at least one digital subscriber line for data transmission, wherein the synchronization symbol of the digital subscriber line on which a SELT diagnosis needs to be performed and the synchronization symbol of the at least one digital subscriber line for data transmission are uplink or downlink synchronization symbols;
detecting whether a condition of carrying the SELT measurement signal is met; and
carrying, when the detecting detects that the condition of carrying the SELT measurement signal is met, the SELT measurement signal over the aligned synchronization symbol of the digital subscriber line on which the SELT diagnosis needs to be performed, until all SELT measurement signals are carried and sent,
wherein the SELT measurement signal is used to detect transmission quality or a line fault of the digital subscriber line.

2. The method according to claim 1, wherein the SELT measurement signal is orthogonal to a signal carried over the aligned synchronization symbol of the at least one digital subscriber line for data transmission.

3. The method according to claim 2, wherein the signal carried over the aligned synchronization symbol of the at least one digital subscriber line for data transmission comprises a training signal, wherein the training signal is used to eliminate crosstalk on the digital subscriber line.

4. The method according to claim 1, wherein the carrying the SELT measurement signal over the aligned synchronization symbol of the digital subscriber line on which the SELT diagnosis needs to be performed comprises:
carrying the SELT measurement signal over some subcarriers of the aligned synchronization symbol of the digital subscriber line on which the SELT diagnosis needs to be performed.

5. The method according to claim 4, wherein the some subcarriers are selected continuously or periodically.

6. The method according to claim 1, wherein:
the detecting whether the condition of carrying the SELT measurement signal is met comprises:
detecting whether the signal carried over the synchronization symbol of the at least one digital subscriber line for data transmission is orthogonal to the SELT measurement signal; and
the carrying comprises:
when the detecting detects that the signal carried over the synchronization symbol of the at least one digital subscriber line for data transmission is not orthogonal to the SELT measurement signal, interrupting carrying and sending the SELT measurement signal over the aligned synchronization symbol of the digital subscriber line on which the SELT diagnosis needs to be performed; and
when the detecting detects that the signal carried over the synchronization symbol of the at least one digital subscriber line for data transmission is orthogonal to the SELT measurement signal, carrying and sending the SELT measurement signal over the aligned synchronization symbol of the digital subscriber line on which the SELT diagnosis needs to be performed, until all SELT measurement signals are carried and sent.

7. The method according to claim 1, wherein:
the detecting whether the condition of carrying the SELT measurement signal is met comprises:
detecting whether the signal carried over the synchronization symbol of the at least one digital subscriber line for data transmission and the SELT measurement signal are carried and sent over different subcarriers, and
the carrying comprises:
when the detecting detects that the signal carried over the synchronization symbol of the at least one digital subscriber line for data transmission and the SELT measurement signal are carried and sent over a same subcarrier, interrupting carrying and sending the SELT measurement signal over the aligned synchronization symbol of the digital subscriber line on which the SELT diagnosis needs to be performed; and when the detecting detects that the signal carried over the synchronization symbol of the at least one digital subscriber line for data transmission and the SELT measurement signal are carried and sent over different subcarriers, carrying the SELT measurement signal over the aligned synchronization symbol of the digital subscriber line on which the SELT diagnosis needs to be performed, until all SELT measurement signals are carried and sent.

8. The method according to claim 1, wherein:

the detecting whether the condition of carrying the SELT measurement signal is met comprises:

detecting whether a downlink synchronization symbol of the digital subscriber line on which a SELT diagnosis needs to be performed and a downlink synchronization symbol of the at least one digital subscriber line for data transmission are in a time division duplex downlink timeslot; and the carrying comprises:

when the detecting detects that the downlink synchronization symbol of the digital subscriber line on which the SELT diagnosis needs to be performed and the downlink synchronization symbol of the at least one digital subscriber line for data transmission are in a time division duplex uplink timeslot, interrupting carrying and sending the SELT measurement signal over the aligned downlink synchronization symbol of the digital subscriber line on which the SELT diagnosis needs to be performed; and when the detecting detects that the downlink synchronization symbol of the digital subscriber line on which the SELT diagnosis needs to be performed and the downlink synchronization symbol of the at least one digital subscriber line for data transmission are in a time division duplex downlink timeslot, carrying the SELT measurement signal over the aligned downlink synchronization symbol of the digital subscriber line on which the SELT diagnosis needs to be performed, until all SELT measurement signals are carried and sent.

9. The method according to claim 1, wherein:

the detecting whether the condition of carrying the SELT measurement signal is met comprises:

detecting whether an uplink synchronization symbol of the digital subscriber line on which a SELT diagnosis needs to be performed and an uplink synchronization symbol of the at least one digital subscriber line for data transmission are in a time division duplex uplink timeslot; and the carrying comprises:

when the detecting detects that the uplink synchronization symbol of the digital subscriber line on which the SELT diagnosis needs to be performed and the uplink synchronization symbol of the at least one digital subscriber line for data transmission are in a time division duplex downlink timeslot, interrupting carrying and sending the SELT measurement signal over the aligned uplink synchronization symbol of the digital subscriber line on which the SELT diagnosis needs to be performed; and when the detecting detects that the uplink synchronization symbol of the digital subscriber line on which the SELT diagnosis needs to be performed and the uplink synchronization symbol of the at least one digital subscriber line for data transmission are in a time division duplex uplink timeslot, carrying the SELT measurement signal over the aligned uplink synchronization symbol of the digital subscriber line on which the SELT diagnosis needs to be performed, until all SELT measurement signals are carried and sent.

10. An apparatus for sending a single-ended loop testing (SELT) measurement signal, comprising:

a memory storing instructions; and at least one processor connected to the memory, the at least one processor configured to, including configured by the instructions, to:

align a synchronization symbol of a digital subscriber line on which a SELT diagnosis needs to be performed with a synchronization symbol of at least one digital subscriber line for data transmission, wherein the synchronization symbol of the digital subscriber line on which a SELT diagnosis needs to be performed and the synchronization symbol of the at least one digital subscriber line for data transmission are uplink or downlink synchronization symbols, detect whether a condition of carrying the SELT measurement signal is met, and carry, when the at least one processor detects that the condition of carrying the SELT measurement signal is met, the SELT measurement signal over the aligned synchronization symbol of the digital subscriber line on which the SELT diagnosis needs to be performed, until all SELT measurement signals are carried and sent, wherein the SELT measurement signal is used to detect transmission quality or a line fault of the digital subscriber line.

11. The apparatus according to claim 10, wherein the at least one processor is further configured to:

detect whether a signal carried over the synchronization symbol of the at least one digital subscriber line for data transmission is orthogonal to the SELT measurement signal, and when the at least one processor detects that the signal carried over the synchronization symbol of the at least one digital subscriber line for data transmission is not orthogonal to the SELT measurement signal, interrupt carrying and sending the SELT measurement signal over the aligned synchronization symbol of the digital subscriber line on which the SELT diagnosis needs to be performed, and when the at least one processor detects that the signal carried over the synchronization symbol of the at least one digital subscriber line for data transmission is orthogonal to the SELT measurement signal, carry the SELT measurement signal over the aligned synchronization symbol of the digital subscriber line on which the SELT diagnosis needs to be performed, until all SELT measurement signals are carried and sent.

12. The apparatus according to claim 10, wherein the at least one processor is further configured to:

detect whether a signal carried over the synchronization symbol of the at least one digital subscriber line for data transmission and the SELT measurement signal are carried and sent over different subcarriers, when the at least one processor detects that the signal carried over the synchronization symbol of the at least one digital subscriber line for data transmission and the SELT measurement signal are carried and sent over a same subcarrier, interrupt carrying and sending the SELT measurement signal over the aligned synchronization symbol of the digital subscriber line on which the SELT diagnosis needs to be performed, and when the at least one processor detects that the signal carried over the synchronization symbol of the at least one digital subscriber line for data transmission and the SELT measurement signal are carried and sent over different subcarriers, carry the SELT measurement signal over the aligned synchronization symbol of the digital subscriber line on which the SELT diagnosis needs to be performed, until all SELT measurement signals are carried and sent.

13. The apparatus according to claim 10, wherein the at least one processor is further configured to:

detect whether a downlink synchronization symbol of the digital subscriber line on which a SELT diagnosis needs to be performed and a downlink synchronization symbol of the at least one digital subscriber line for data transmission are in a time division duplex downlink timeslot, when the at least one processor detects that the downlink synchronization symbol of the digital subscriber line on which the SELT diagnosis needs to be performed and the downlink synchronization symbol of the at least one digital subscriber line for data transmission are in a time division duplex uplink timeslot, interrupt carrying and sending the SELT measurement signal over the aligned downlink synchronization symbol of the digital subscriber line on which the SELT diagnosis needs to be performed, and when the at least one processor detects that the downlink synchronization symbol of the digital subscriber line on which the SELT diagnosis needs to be performed and the downlink synchronization symbol of the at least one digital subscriber line for data transmission are in a time division duplex downlink timeslot, carry the SELT measurement signal over the aligned downlink synchronization symbol of the digital subscriber line on which the SELT diagnosis needs to be performed, until all SELT measurement signals are carried and sent.

14. The apparatus according to claim 10, wherein the at least one processor is further configured to:

detect whether an uplink synchronization symbol of the digital subscriber line on which the SELT diagnosis needs to be performed and an uplink synchronization symbol of the at least one digital subscriber line for data transmission are in a time division duplex uplink timeslot, when the at least one processor detects that the uplink synchronization symbol of the digital subscriber line on which the SELT diagnosis needs to be performed and the uplink synchronization symbol of the at least one digital subscriber line for data transmission are in a time division duplex downlink timeslot, interrupt carrying and sending the SELT measurement signal over the aligned uplink synchronization symbol of the digital subscriber line on which the SELT diagnosis needs to be performed, and when the at least one processor detects that the uplink synchronization symbol of the digital subscriber line on which the SELT diagnosis needs to be performed and the uplink synchronization symbol of the at least one digital subscriber line for data transmission are in a time division duplex uplink timeslot, carry the SELT measurement signal over the aligned uplink synchronization symbol of the digital subscriber line on which the SELT diagnosis needs to be performed, until all SELT measurement signals are carried and sent.

15. A control device for controlling sending of a single-ended loop testing (SELT) measurement signal, comprising:

a controller, comprising at least one processor, configured to align a synchronization symbol of a digital subscriber line on which a SELT diagnosis needs to be performed with a synchronization symbol of at least one digital subscriber line for data transmission, wherein the synchronization symbol of the digital subscriber line on which a SELT diagnosis needs to be performed and the synchronization symbol of the at least one digital subscriber line for data transmission are uplink or downlink synchronization symbols and to detect whether a condition of carrying the SELT measurement signal is met, and a transceiver, configured to carry, when the controller detects that the condition of carrying the SELT measurement signal is met, the SELT measurement signal over the aligned synchronization symbol of the digital subscriber line on which the SELT diagnosis needs to be performed, until all SELT measurement signals are carried and sent, wherein the SELT measurement signal is used to detect transmission quality or a line fault of the digital subscriber line.

* * * * *